Nov. 24, 1931.  K. E. PEILER  1,833,302
CONTINUOUS TWO-TABLE BOTTLE MACHINE
Filed Dec. 5, 1928  2 Sheets—Sheet 1

Witnesses:
Winslow B. Thayer
A. A. Horn

Inventor
Karl E. Peiler
by Robson D. Bauer
Attorney.

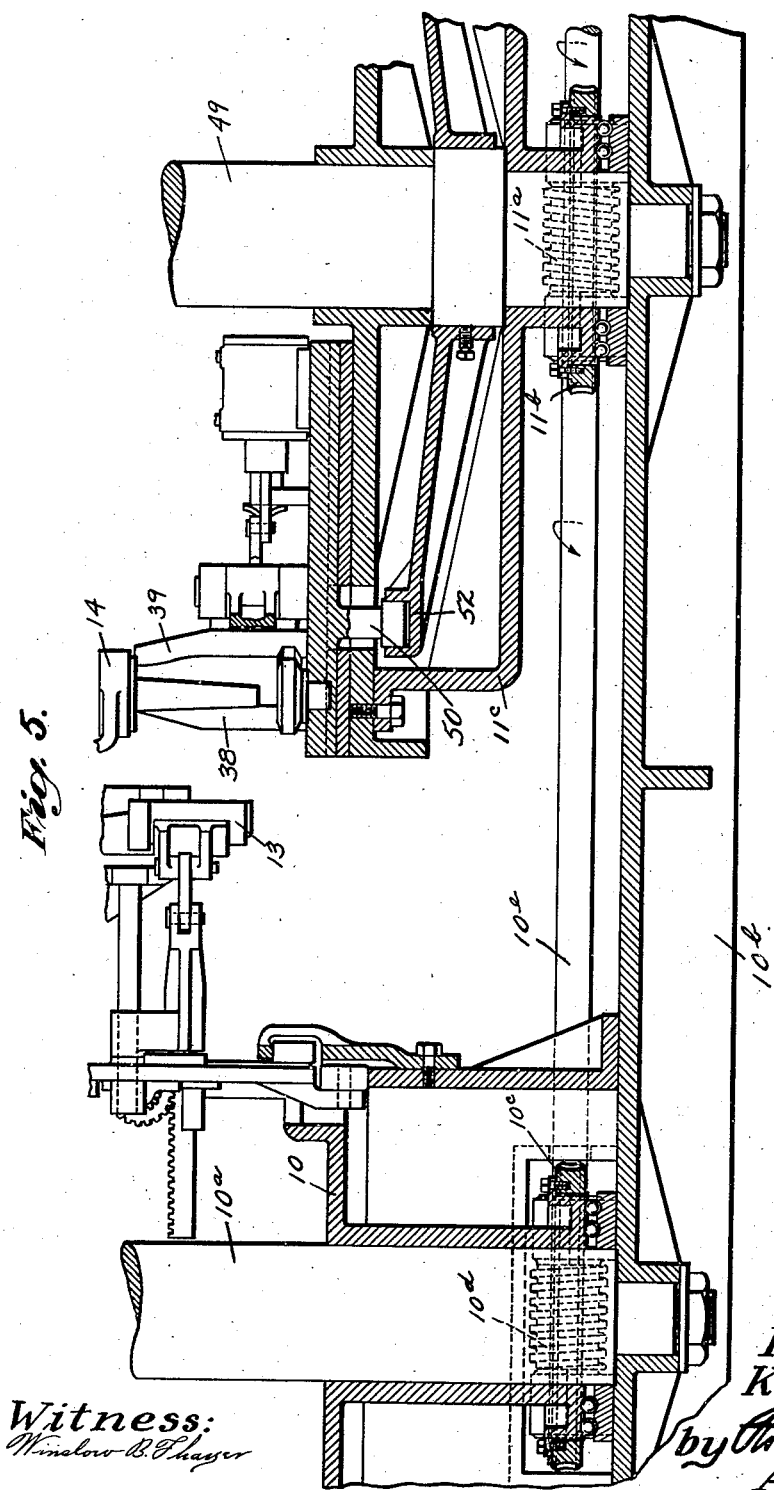

Patented Nov. 24, 1931

1,833,302

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

CONTINUOUS TWO TABLE BOTTLE MACHINE

Application filed December 5, 1928. Serial No. 323,954.

My invention relates to an apparatus for and methods of manufacturing glassware, particularly hollow glassware, which is formed by blowing or by pressing and blowing. This application contains subject matter disclosed in my copending application, Serial No. 87,800, filed February 12, 1926.

It is usual in the manufacture of bottles and similar ware, to first form the glass in a preliminary mold known as the blank mold, or parison mold, which gives a preliminary shape to the glass, forming it into a parison either by pressing or by blowing and to thereafter transfer the parison or blank so formed to a blow mold, wherein it is blown to final form. It is customary also to provide a third mold part known as the neck mold or neck ring, which is first associated with the blank or parison mold and imparts to the glass the top or neck finish of the article. After the parison has been formed in the neck mold and parison mold, it is usual to open the parison mold and to transfer the parison automatically to the blow mold. This is usually and frequently accomplished by suspending the parison in the closed neck ring which is moved into a position to permit the blow mold to close about the body of the parison. The blowing of the parison to final form in the blow mold has heretofore been accomplished either through the neck ring, or after a removal of the neck ring. Apparatus for such blowing by either method is well known in the art.

It has heretofore been proposed to provide a bottle machine comprising two tables or spiders revolving about spaced vertical axes, one of which tables carries the blank molds, the neck rings, and associated mechanisms, and the other of which carries the blow molds and associated mechanisms. The blank molds and the blow molds are thus caused to rotate about different axes in paths which are tangent or adjacent at one point at which the transfer of the parison to the blow mold is accomplished. However, this transfer has been accomplished prior to my invention only by the use of intermittently rotated tables and when the tables are stationary.

It has also long been considered desirable to make use of a continuously rotating machine and machines of this type have been provided and used in which the cooperating blank mold, blow mold and neck ring are all mounted on a single table or spider revolving about a single axis.

There has been to my knowledge no use of a continuously rotating machine provided with two tables rotating about different centers. One of the chief reasons why such machines have not heretofore proved practical resides in the difficulty of accomplishing the transfer of the blank to the blow mold while the two tables are rotating about different centers.

My invention, therefore, has for its object the provision of a continuously rotating two-table machine provided with novel and efficient means for accomplishing the transfer of the blank while the tables are rotating.

More specifically, the object of the invention is to provide a continuously rotating two-table machine in which the blow mold is, at the suitable time, moved radially of its own table and caused to travel in the path of the neck ring, for a space sufficient to accomplish the transfer.

I am thus enabled to combine in one machine the advantages present in the continuously rotating type of forming machine, as well as those present in the two-table type.

Other objects of my invention will appear from the following specification and claims.

One form of the mechanical features of my invention is shown in the accompanying drawings, in which:

Fig. 5 is a view in vertical section of the apparatus shown in Figs. 1 and 2 illustrating particularly the mechanism for continuously rotating the mold tables.

Figure 1:
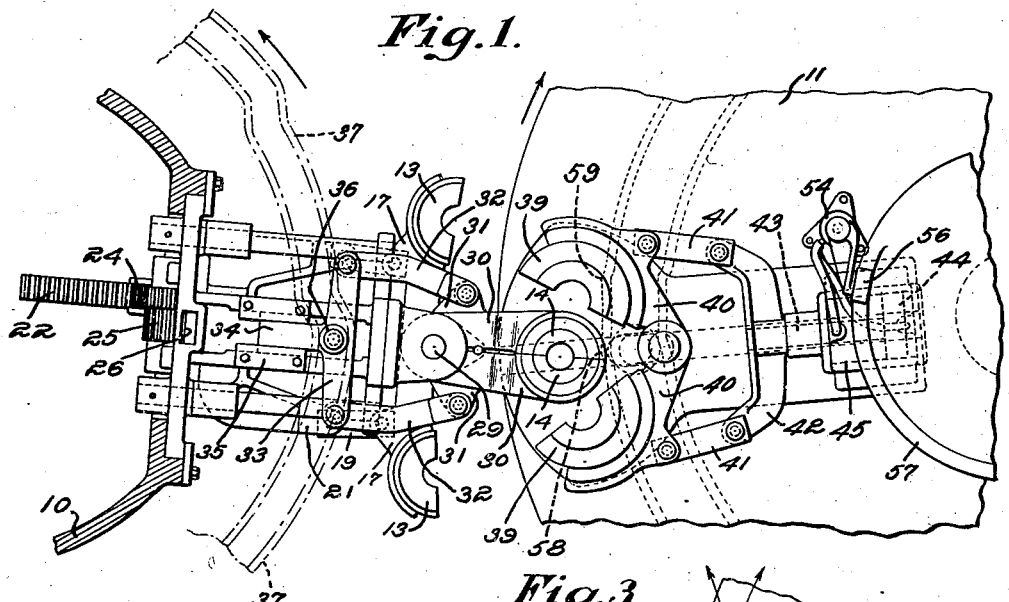
Figure 1 is a fragmentary plan view of my novel two-table continuously rotating forming machine. Some operating parts of the machine which are common to machines of the prior art have been omitted for the sake of clearness.

Referring to the drawings:

10 illustrates the blank mold table or spider and 11 the blow mold table of a continuously rotating two-table glass fabricating machine. The table 10 is rotatably mounted upon a column 10a arising from a base 10b as shown in Fig. 5, and the table 11 similarly is mounted upon its column 49 carried by said base. Mounted on the hub of table 10 is a helical gear 10c with which a worm 10d is in mesh. The worm 10d is carried by a horizontal shaft 10e which also has mounted thereon a worm 11a in mesh with a helical gear 11b mounted on the hub portion of a hollow casting 11c secured to the underside of the table 11 as shown in Fig. 5. The shaft 10e is continuously driven in the direction indicated by the arrows, Fig. 5, by suitable means, not shown, so that the tables are driven in synchronism to present each blank mold and its cooperating blow mold at the point of tangency of their paths at the proper time in their cycle for the transfer operation.

The blank mold table 10 comprises a rotating spider 12, carrying a plurality of units each of which comprises a blank mold 13, a neck ring 14 and means for opening and closing both the blank mold and the neck ring. Also each of the units is supplied at suitable time with pressing and/or blowing means (not shown), for forming the parison in the mold. The blank mold table is provided with certain non-rotating parts which carry cams or other suitable mechanism for causing operative movements of the blank mold and neck ring mechanism. 15 and 16 indicate such parts.

The blank mold is shown as formed by two half sections 13 mounted on arms 17 which are pivoted as at 18, and are provided with ears pivotally connected to links 19 which in turn are pivoted to a cross head 21. The cross head 21 is attached to a horizontal rack 22. Movement is imparted to the rack 22 to open and close the mold, through a pinion 24 mounted on a shaft on which is also mounted a second pinion 25, which is in mesh with a vertical rack 26. The rack 26 carries a cam roller 27 adapted to run in a cam track 28 on the stationary part 15. Thus the rotation of the table causes the timely opening and closing of the blank mold.

The neck ring is similarly made in two halves 14, mounted on arm 30 pivoted on a stationary pivot 29. The arms 30 carry ears 31 which are connected by links 32 to a cross head 33, which head carries a rearwardly extending guiding portion 34 adapted to slide in guideways 35. The cross head is provided with a cam roll 36 adapted to run in a closed cam path 37 in the stationary member 16. Thus the neck ring halves are opened and closed at suitably selected time in response to the rotation of the blank mold table. As stated, suitable pressing and/or blowing mechanism is associated with the blank molds and neck rings to form the parisons.

The parison forming operation is substantially as follows: At a suitable point in the rotation, the closed blank mold and neck ring are provided with a suitable charge of molten glass. This may be accomplished by the well-known suction method, in which case suitable suction mechanism must be supplied to the table and to each unit, or the glass may be supplied by hand or by other automatic means. The blank mold and/or the neck ring may be adapted for inversion, in which case the mold charge may be dropped into the inverted blank mold. The charge is then compacted in the neck ring and blank mold and a cavity is formed in the glass, either by having the glass drawn up around a downwardly projecting plunger, by forcing a plunger into the glass, by blowing or by a combination of these means.

Figures 2, 3, 4:
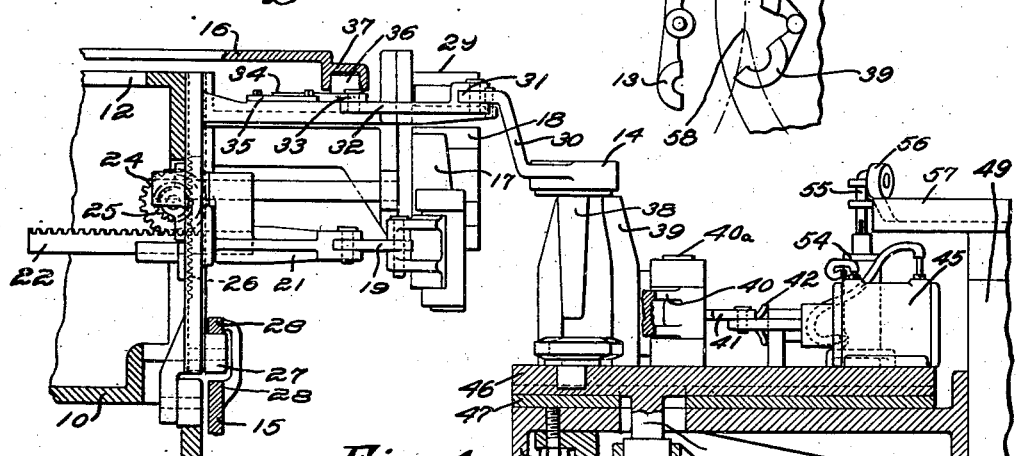
Fig. 2 is a view in elevation and partly in section of the apparatus of Fig. 1.
Figs. 3 and 4 are diagrammatic illustrations of my method of transfer.

The glass charges are thus given the desired neck or mouth shape of the finished ware and the lower portions thereof are given a shape suitable for blowing to final form in the blow mold, thus forming them into parisons, (see showing of the suspended parison 38, Fig. 2). By this time the blank mold in question is approaching a position at which its path is tangent or most nearly approaches the path of its associated blow mold, at which the transfer is to take place. Prior to reaching this position, the cam 28 causes the blank or parison mold to open, leaving the completed parison suspended from the neck ring which is still closed. The transfer is accomplished as hereinafter described.

The blow mold table 11 is provided with a plurality of blow mold units each of which comprises a blow mold comprising the halves 39 mounted on arms 40 on a pivot 40a. The arms 40 are connected by the links 41 to a cross head 42 attached to the piston rod 43 of a piston 44, working in a cylinder 45. All of the blow mold mechanism so far described is mounted on a carriage or plate 46 which is adapted to slide radially of the table 11 in a slide 47 on the rotating support 48. The plate 46 is provided with a downwardly depending shaft 50, passing through a slot in the support 48 and carrying a cam roller 51 adapted to ride in a closed cam path 52 in a stationary member or web 53, so that the plate and the parts carried thereby are given radial movement at suitable times determined by the shape of the cam.

The opening and closing of the mold halves 39 of the blow mold is accomplished by the application of air pressure to the ends of the cylinder 45. The application and exhaust of air is controlled by a slide valve 54 mounted on the support 48 and provided with suitable ports and a valve stem 55, carrying a cam roll 56 adapted to run on a stationary cam member 57. By this arrangement the application of air and the consequent opening and closing of the mold is determined by the movement of the blow mold table.

Suitable mechanism for applying compressed air to blow the blank to final form (not shown) is provided. This mechanism is well known in the art and in and of itself forms no part of my present invention.

The shape of the cam 52 is shown in Fig. 1 and its effect upon the movement of the blow mold is indicated in Fig. 3. In the particular embodiment shown, the arrangement is such that the center lines of the paths of movement of the neck ring and of the blow mold, when the blow mold is in normal position, are tangent at one point, indicated at 58, Figs. 1, 3 and 4. The cam path 52 is such that the blow mold moves in a circular path about the axis of the blow mold table until it reaches the point 58, whereupon it is moved radially and is caused to follow a path directly below and concentric with the path of the neck ring for a space indicated between the points 58 and 59 (Figs. 1 and 3). During this space, the blow mold is closed about the suspended parison and the neck ring is opened. Thus the transfer is accomplished. If desired, the normal paths of the molds of the two tables need have no point of tangency. In such case, the blow mold may be first moved radially to a point tangential with the normal path of movement of the blank mold and then caused to follow a path immediately below that of the neck ring for a distance necessary to permit the transfer.

The structure shown herein may be modified in many respects without departing from my invention as set forth in the appended claims.

I claim:

1. A two-table continuously rotating glass forming machine provided with a blank mold and neck ring mounted on one table and a blow mold mounted on the other table, means for continuously rotating said tables, means for effecting the transfer of a blank to the blow mold, means for moving the blow mold relative to its table to cause it to travel during the transfer operation in a path below and concentric with the path of the neck ring.

2. Apparatus for fabricating glassware, means for forming a parison, including a parison mold and neck ring adapted to continuously move in a closed path about a center, a blow mold mounted to move in a closed path about a different center, means for moving the parison mold and neck mold and the blow mold about their respective centers, means for opening and closing the molds, and means for moving the blow mold radially of its center of movement and causing it to travel in the path of the parison mold for a space sufficient to accomplish the transfer of a parison formed in the parison mold to the blow mold, while said blow mold is moving.

3. A continuously rotating two-table glass forming machine, comprising means for continuously rotating said tables, a blank mold and neck ring mounted on one of said tables and adapted to receive a charge of molten glass and to form the same into a glass parison, a blow mold mounted upon the other of said tables and adapted to receive the parison and to impart final form thereto, means for moving the blow mold relatively to its table and for causing it to travel in a path concentric with and below the neck ring during a portion of its travel, means for opening the blank mold while the neck ring is closed about the neck of a parison, means for closing the blow mold about the suspended parison while it is travelling below and in a path concentric with the path of the neck ring, and means for opening the neck ring during such travel of the blow mold.

4. A continuously rotating two-table glass fabricating machine, means for continuously rotating said tables, means mounted on one of said tables for forming a parison and including a neck ring, means for causing a formed parison to become suspended from the neck ring during a portion of the cycle of the machine, a blow mold mounted on the second of said tables, and means for moving the blow mold relatively to its table and for causing it to close about the suspended parison and to travel for a part of its rotation in a path concentric with and immediately below that of the neck ring, and means for opening the neck ring during such portion of the travel of the blow mold.

5. A continuously rotating two-table glass fabricating machine, means for continuously rotating said tables, a blow mold and means for opening and closing the same, means for slidably mounting the blow mold upon one of the continuously rotating tables, and means including a cam for moving the blow mold radially of said table during a portion of its rotation and for causing it to travel in a circular path about the center of the other table, and means carried upon the other table for forming a parison and presenting it to the blow mold during the blow mold travel in said path.

6. A glassware fabricating machine comprising a blank mold table, a blank mold thereon, a neck mold associated with the blank mold, means for constantly supporting said molds in position to be closed in axial alignment with each other, a blow mold table, a blow mold thereon, means for continuously rotating said tables, the rotation of said mold tables causing the blank and neck molds and the blow mold simultaneously to approach each other while travelling in the same general direction through a transfer zone, means operating in synchronism with the rotation of the mold table for opening the blank mold during the movement thereof toward the transfer zone, to leave a previously formed parison suspended from the neck mold, which neck mold and parison are moved along a path through the transfer zone, means for opening the blow mold, means actuated in timed relation to the arrival of the molds in the transfer zone for imparting a lateral component of motion to the open blow mold toward the suspended parison, said last named means being constructed to cause the blow mold to follow the path of the neck mold and parison in the transfer zone, means for closing the blow mold about the parison as they move together along substantially the same path, and means for opening the neck mold to release the parison in the blow mold, whereby the parison is transferred to the blow mold while the molds are rotating.

7. A glassware fabricating machine comprising a blank mold table, a blank mold thereon, a neck mold associated with the blank mold, means for constantly supporting said molds in position to be closed in axial alignment with each other, a blow mold table, a blow mold thereon, means for continuously rotating said tables, the rotation of said mold tables causing the blank and neck mold and the blow mold simultaneously to approach each other while travelling in the same general direction through a transfer zone, and the said parison and neck molds and the blow mold being so positioned on their respective tables that they come into alignment on a line between the centers of the said tables in said transfer zone, means operating in synchronism with the rotation of the mold table for opening the blank mold during the movement thereof toward the transfer zone to leave a previously formed parison suspended from the neck mold, means for opening the blow mold, means actuated in timed relation to the arrival of the molds at the transfer zone for imparting a lateral component of motion to the open blow mold toward the suspended parison and to cause the blow mold to travel in axial alignment with the parison, means for closing the blow mold about the parison, means for opening the neck mold to release the parison in the blow mold, whereby the parison is transferred to the blow mold while the molds are rotating, the means for moving the blow mold laterally and for closing the blow mold being so designed and timed with respect to the rotation of the mold tables that the delivery of the parison to the blow mold is effected substantially on the line connecting the centers of the said table.

8. A glassware fabricating machine comprising a blank mold table, a blank mold thereon, a neck mold associated with the blank mold, means for constantly supporting said molds in a position to be closed in axial alignment with each other, a blow mold table, a blow mold thereon, means for continuously rotating said tables, the rotation of said tables causing the blank and neck molds and the blow mold simultaneously to approach each other while travelling in the same general direction through a transfer zone, means operating in synchronism with the rotation of the mold tables for opening the blank mold during the movement thereof toward the transfer zone, to leave a previously formed parison suspended from the neck mold, means for opening the blow mold, and means actuated in timed relation with the arrival of the molds at the transfer zone for imparting a lateral component of motion to the open blow mold toward the suspended parison, said last-named means being constructed to cause the blow mold to follow the path of movement of the parison about the axis of the blank mold table, means for closing the blow mold about the parison during the movement thereof about the axis of the blank mold table, and means for opening the neck mold to release the parison in the blow mold, whereby the parison is transferred to the blow mold while the molds are rotating.

Signed at Hartford, Conn., this 3rd day of December, 1928.

KARL E. PEILER.